Figure 1:
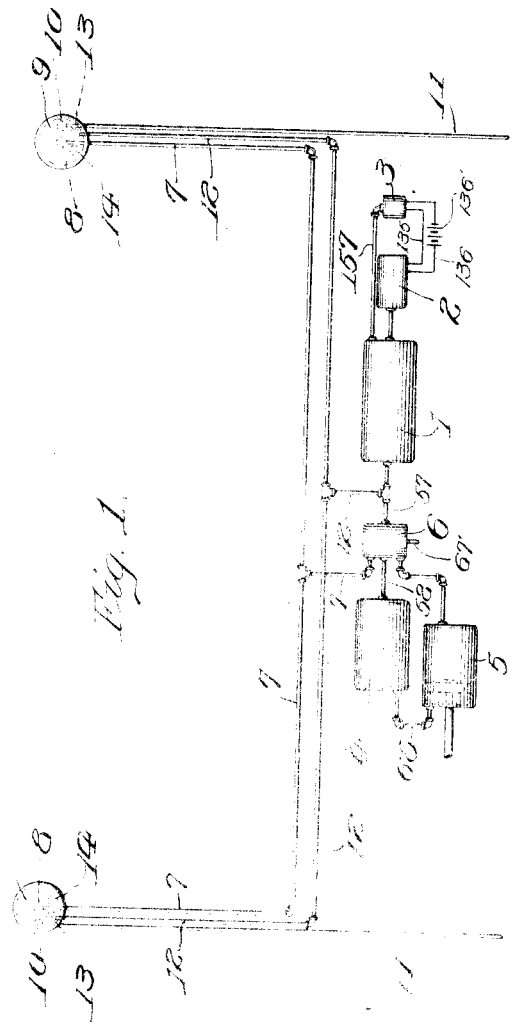

A. J. WISNER.
AIR BRAKE.
APPLICATION FILED SEPT. 12, 1908.

1,091,416.

Patented Mar. 24, 1914.
10 SHEETS—SHEET 1.

WITNESSES

INVENTOR
Andrew J. Wisner.

ATTORNEY

A. J. WISNER.
AIR BRAKE.
APPLICATION FILED SEPT. 12, 1908.

1,091,416.

Patented Mar. 24, 1914
10 SHEETS—SHEET 9.

WITNESSES

INVENTOR
Andrew J. Wisner

BY

ATTORNEY

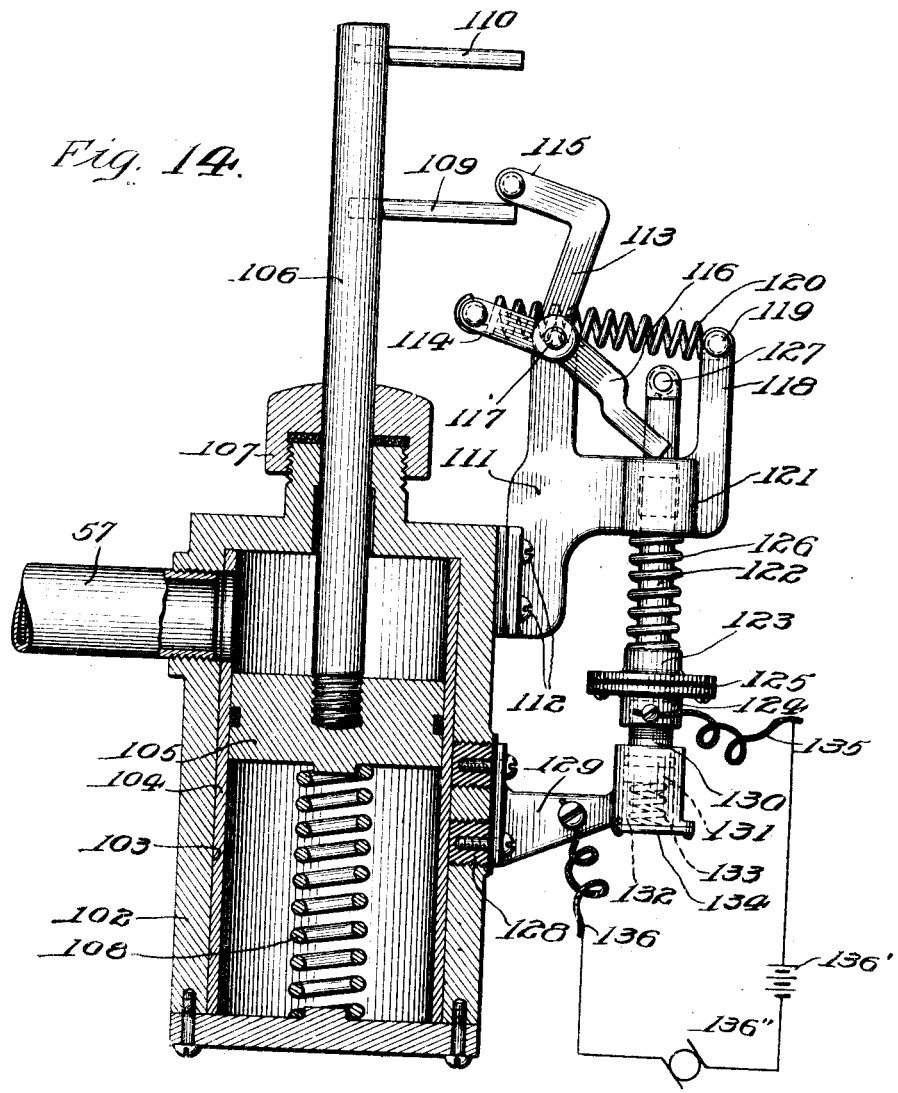

UNITED STATES PATENT OFFICE.

ANDREW J. WISNER, OF PHILADELPHIA, PENNSYLVANIA.

AIR-BRAKE.

1,091,416.

Specification of Letters Patent.

Patented Mar. 24, 1914.

Application filed September 12, 1908. Serial No. 452,786.

*To all whom it may concern:*

Be it known that I, ANDREW J. WISNER, a citizen of the United States, and a resident of the city and county of Philadelphia, State of Pennsylvania, have invented certain new and useful Improvements in Air-Brakes, of which the following is a full, clear, and complete disclosure.

My invention relates to air brakes, and particularly to a system of air brakes for steam and trolley cars which may be used in conjunction with other well known systems now in use.

The objects of my invention are to apply and release the brakes by compressed air without the use of any springs or counterbalancing means to release the brakes; to arrange the main and auxiliary reservoirs and the brake cylinder in the most effective and simple manner; to positively move the brake by compressed air into the released position; to provide a brake which is interchangeable with known and commonly used air brakes, or which can be used in combination therewith; to improve the form of air brake valve for controlling the passage of air from and between the main and auxiliary reservoirs and the brake cylinder and the open air; to make a system which can be used on steam roads where the main reservoir is generally located on the locomotive, and which will work equally well on trolley lines with simple changes wherein each car carries both a main and auxiliary reservoir; to permit of the operation of the brakes either by the air in the auxiliary reservoir, or if the pressure in the auxiliary reservoir falls below a predetermined point, by air directly from the main reservoir; to provide a system in which the auxiliary reservoir is used when the air is above a certain pressure and direct air from the main reservoir is used when the pressure falls below a predetermined point; to use direct air to hold the brakes applied if pressure in the auxiliary reservoir falls below a predetermined point; to provide a controlling valve or engineer's valve which will operate in connection with my improved system; to make a controlling or engineer's valve which is substantially balanced and which will operate the brakes either by air from the auxiliary reservoir, or direct air from the main reservoir as may be desirable or necessary; to provide an efficient and reliable means for regulating the pressure of the main reservoir; to make provision for a quick or rapid reduction of the pressure in the train pipe in applying the brakes; to discharge the air in the train pipe directly into the auxiliary reservoir when the pressure in the auxiliary reservoir falls below the pressure of the train pipe; to make an air brake valve which operates on the balance principle; that is to say, one in which a difference in pressure in the valve moves the piston, but, as soon as the pressure is equalized on both sides of the piston, the piston returns to its normal position; and to provide improvements in the details of the various parts of the device.

Other objects of my invention will appear in my specification and claims below.

Figure 2:
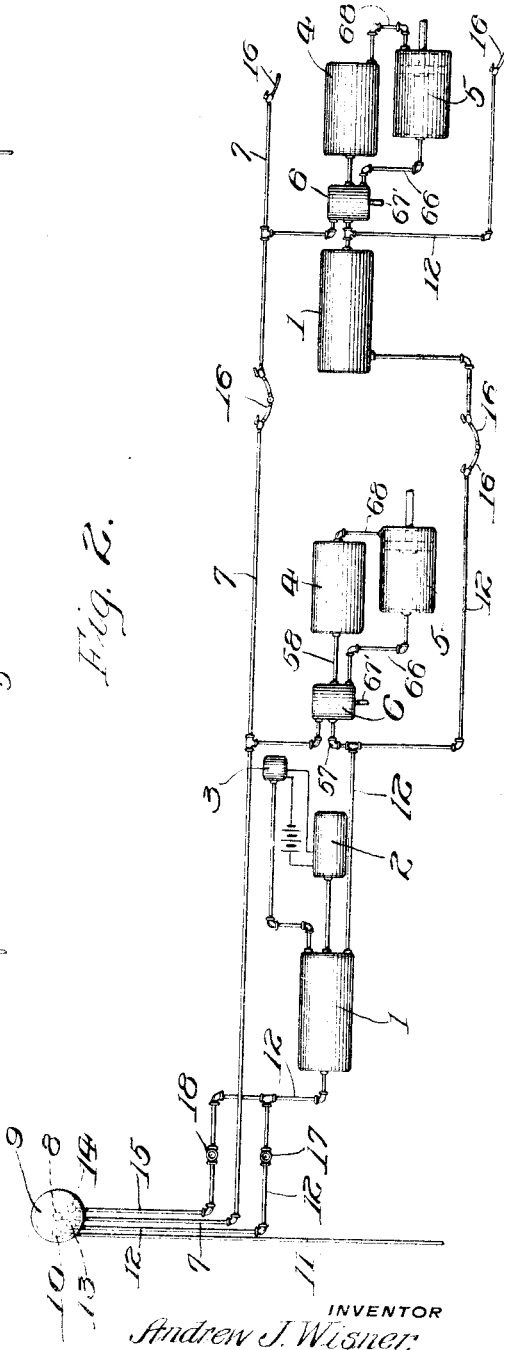
Figure 3:
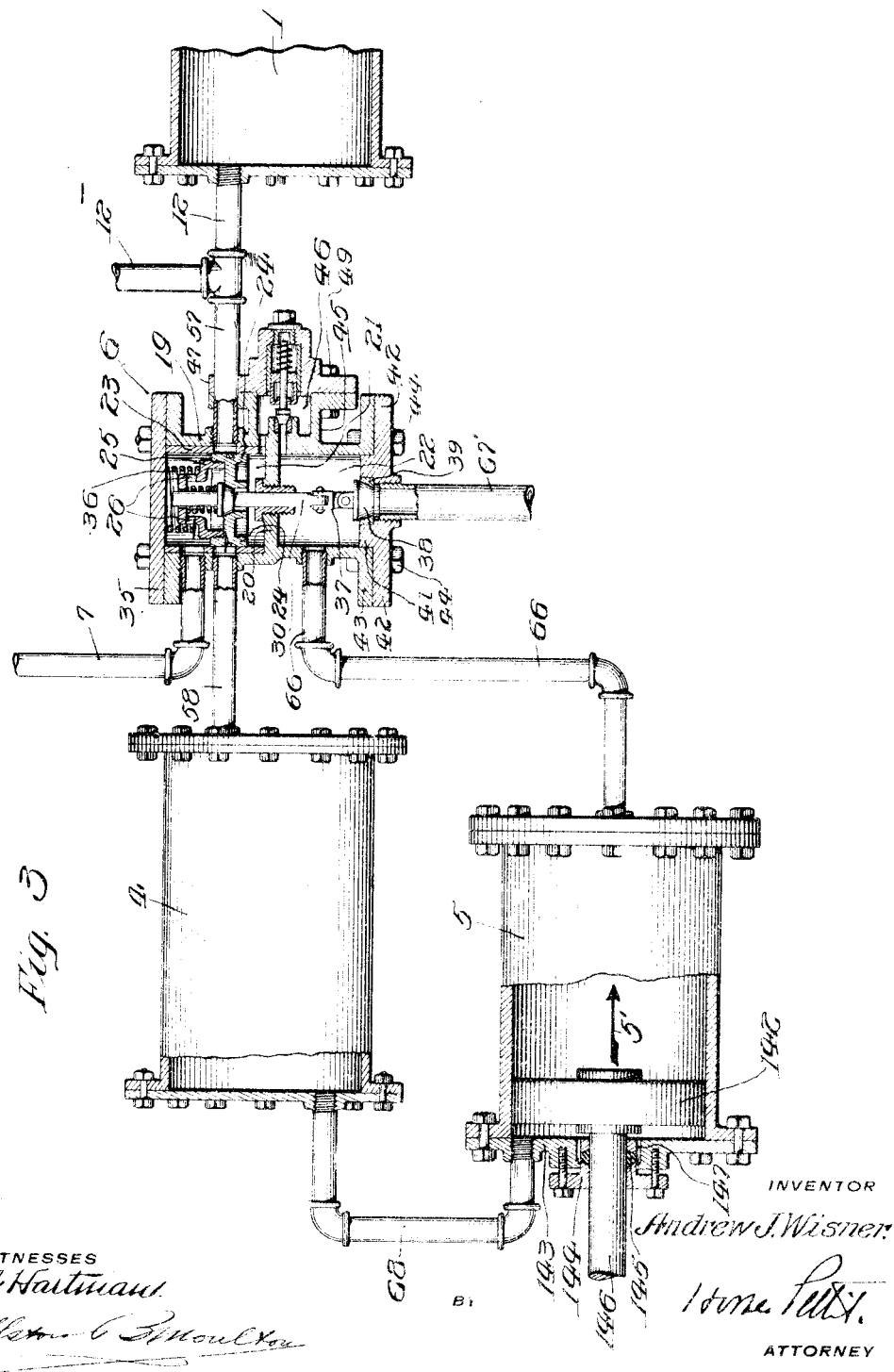
Figure 4:
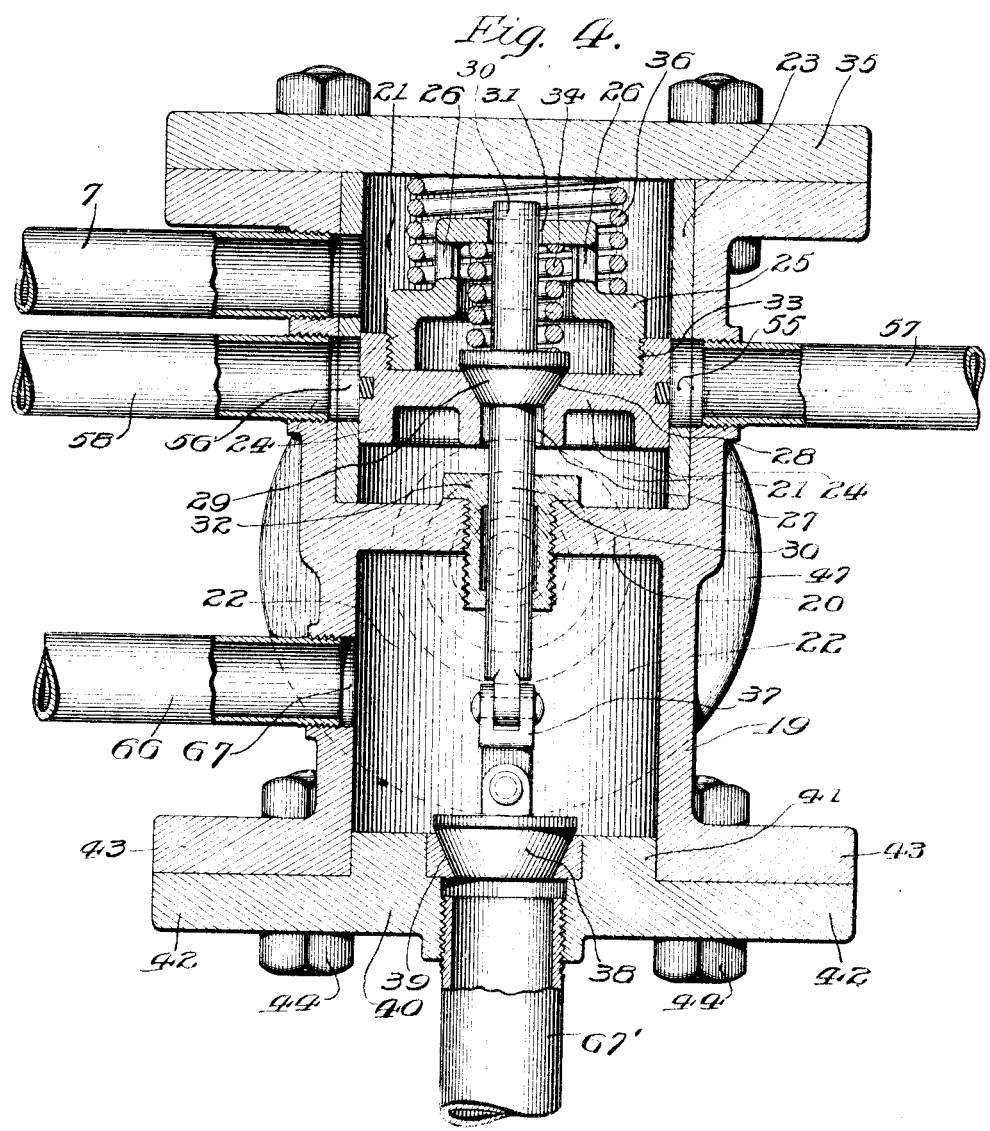
Figure 5:
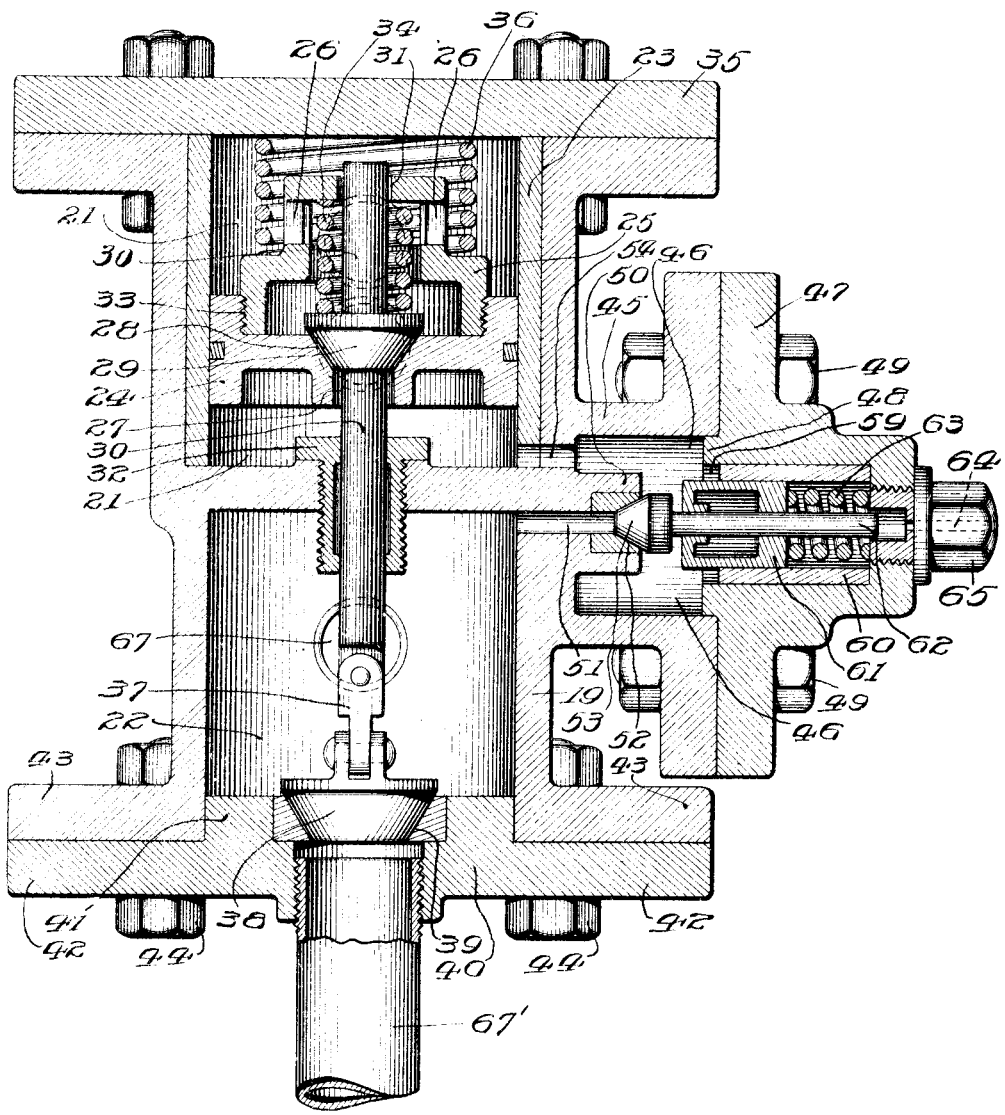
Figure 6:
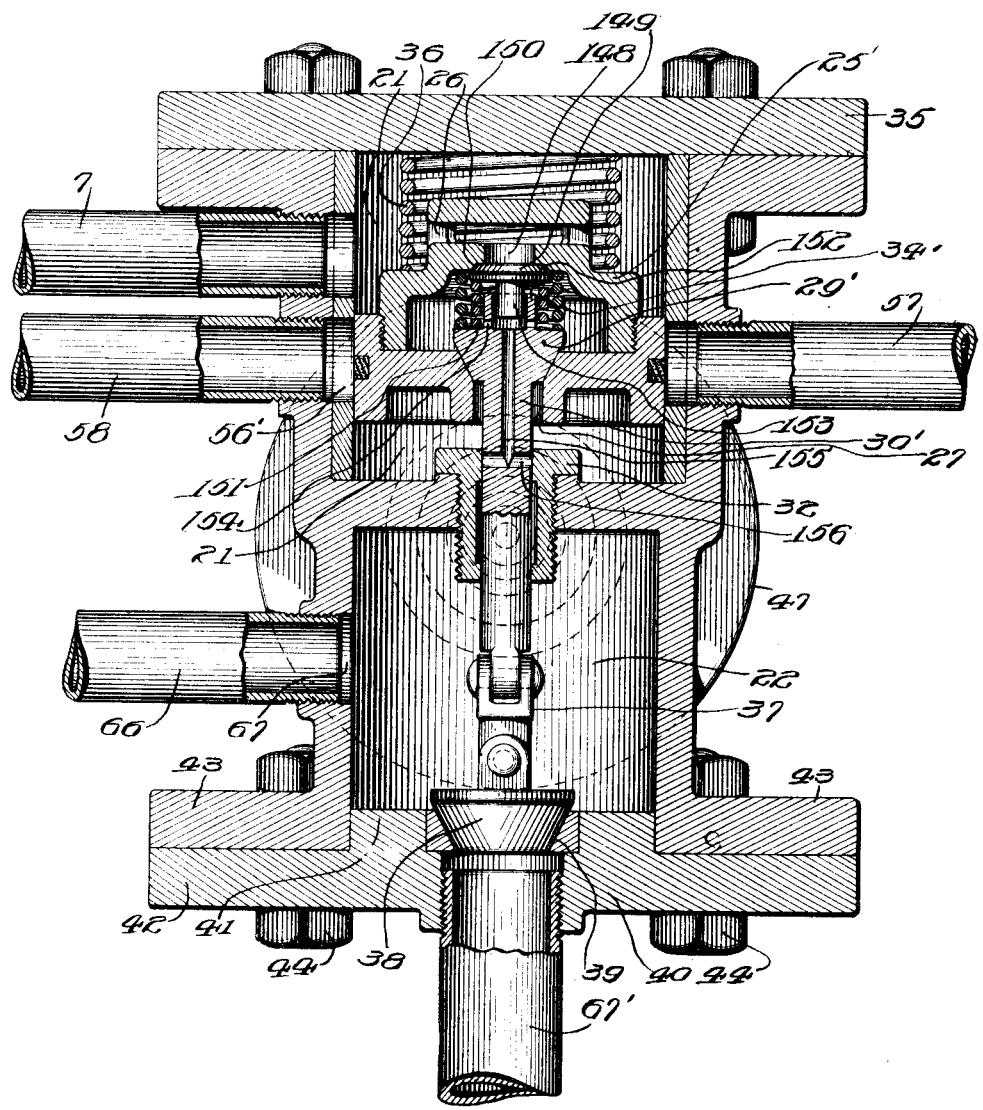
Figure 7:
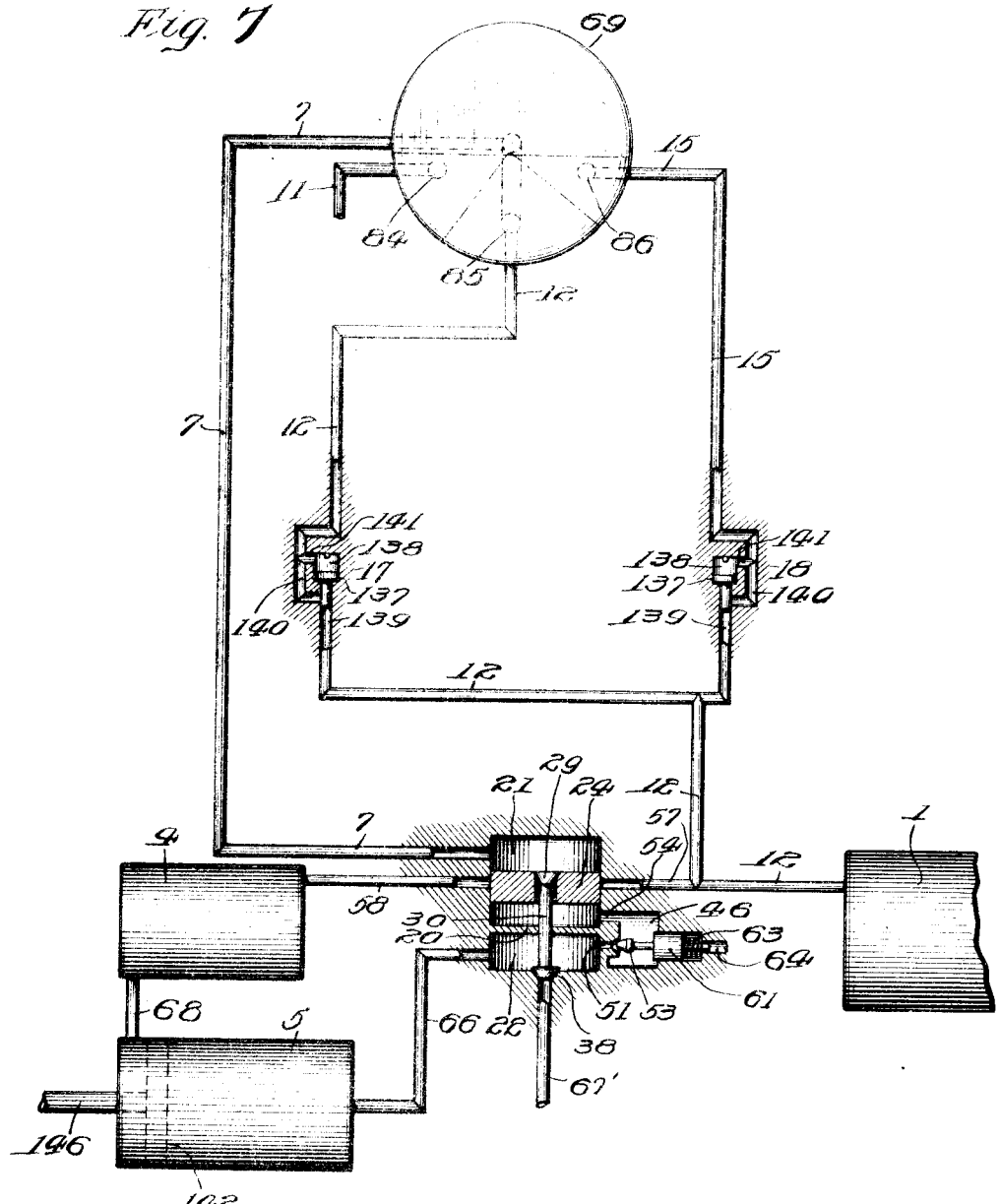
Figure 8:
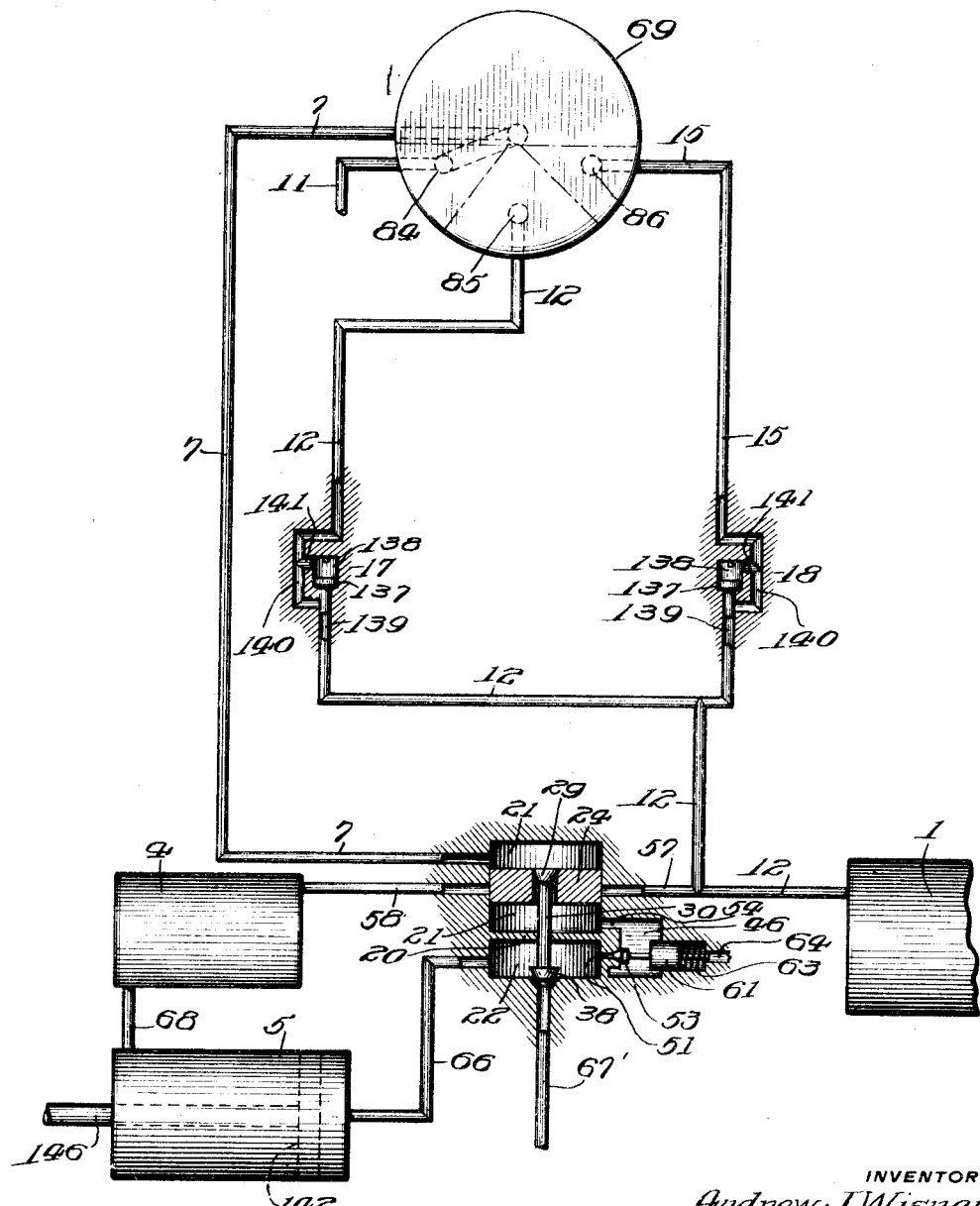
Figure 9:
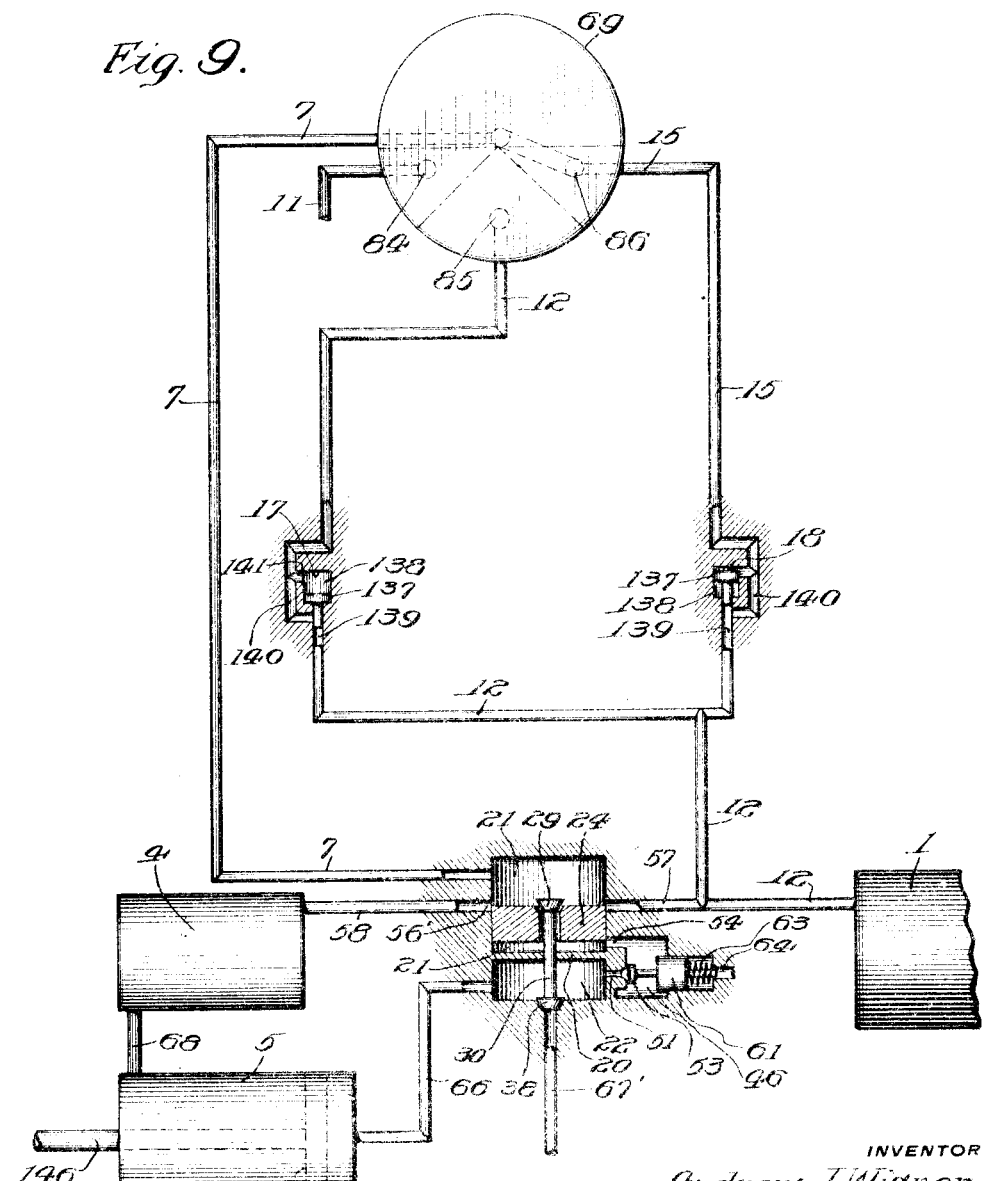
Figure 10:
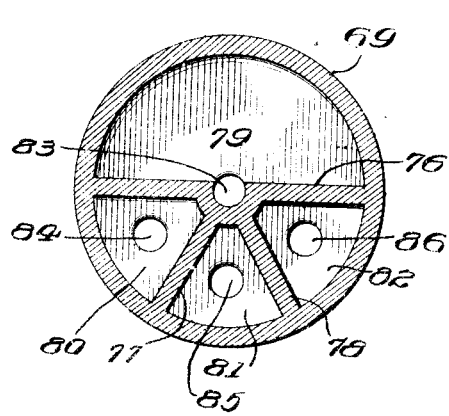
Figure 11:
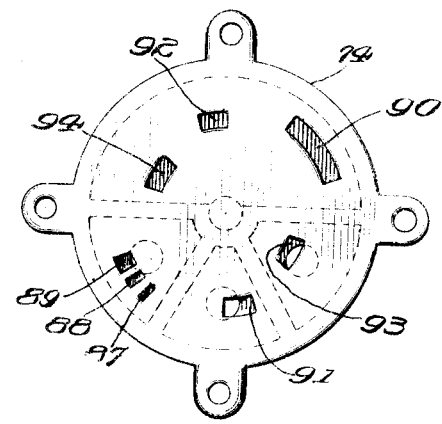
Figure 12:
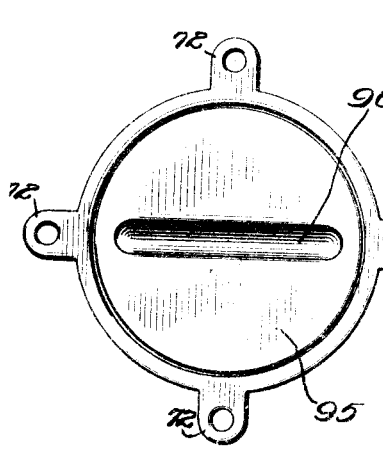
Figure 13:
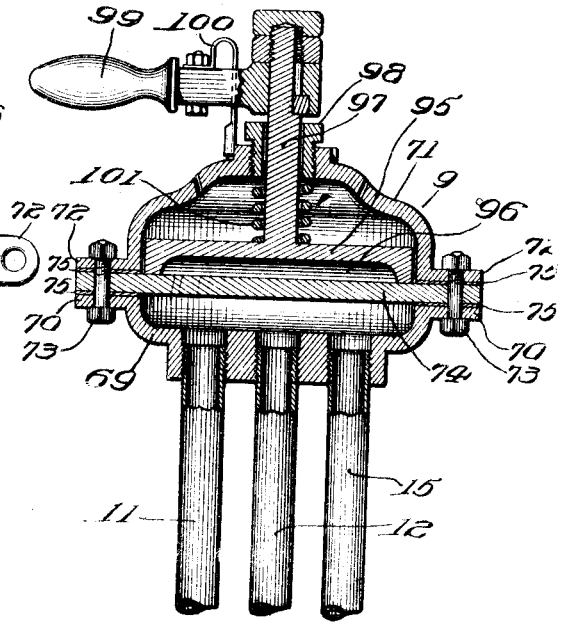

Referring to the drawings, forming a part of this specification, and in which the same characters are used to designate the same parts throughout the various views, Figure 1 indicates diagrammatically my improved system of air brakes as applied to an electric trolley car; Fig. 2 shows diagrammatically, my complete system as applied to a steam train, or a system in which one main reservoir is used to control and supply the air to an auxiliary reservoir located under each car; Fig. 3 illustrates the air brake valve and its connections to the train pipe, main reservoir, auxiliary reservoir, and brake cylinder, the passage between the lower side of the piston of the air brake valve and the reverse end of the brake cylinder being in a plane at right angles to the plane in which the same is actually constructed in order to clearly illustrate the operations of the valve; Fig. 4 is an enlarged vertical sectional view of the air brake valve; Fig. 5 a similar view the section taken at right angles to that of Fig. 4; Fig. 6 is a modified form of the valve shown in Figs. 3, 4 and 5: Figs. 7, 8 and 9 are diagrammatic views showing the different positions of the main or working parts of the system and their positions during the different manipulations of the engineer's or controlling valve; Figs. 10, 11, 12 and 13 are various views showing the engineer's or controlling valve and Fig. 14 is a view partly in vertical section of the automatic governor for regulating the pressure of air in the main reservoir.

Referring first to the diagrammatic showing made in Fig. 1, 1 indicates the main reservoir, 2 the pump for supplying said reservoir with air, 3 the governor controlled by the pressure in the main reservoir 1 for starting and stopping the pump 2; 4 indicates the auxiliary reservoir, 5 the brake cylinder and 6 the air brake valve for controlling the passage of the air to and from the brake cylinder and the main and auxiliary reservoirs; the train pipe is indicated at 7 and is connected with the central port 8 of the engineer's or controlling valve 9—9 located at each end of the car; 10 is a port leading from the controlling valve 9 to the open air through the pipe 11; 12 is a pipe connected to both the main reservoir 1 and the air brake valve 6; this pipe 12 is connected with the port 13—13 of the motorman's valve. In this system, the ports 14—14 are not used. In operating the motorman's valve and consequently the system, the port 8 of the motorman's valve is connected at will with any one of the ports 10, 13 and 14. When the ports 8 and 10 are connected, the train pipe is put into communication with the open air through the pipe 11 to decrease the pressure in the train pipe and effect an application of the brakes in a manner to be described below. When the port 8 is put into communication with the port 13, the train pipe is connected with the main reservoir and the pressure in the train pipe will be built up; at the same time, the brakes will be released which operation will also be described below.

The arrangement in Fig. 2 is very similar to that of Fig. 1; in this case, however, the system is adapted to be used in connection with steam roads. The port 14 is used and is connected by a pipe 15 through the pipe 12 with the main reservoir 1. The train pipe 7 and the main reservoir pipe 12 extend between the cars, suitable couplings 16—16 being used. In the pipes 12 and 15 are reducing valves 17, 18, the function of which is to be explained below. There is in this system, but one controlling valve, commonly called the engineer's valve located in the engine and the main reservoir 1 and compressor 2 and governor 3 are also generally located on the engine, although if desired, a main reservoir 1 may be arranged near each auxiliary cylinder as shown in Fig. 2.

In Fig. 3, the arrangement of the main reservoir 1, auxiliary reservoir 4, brake cylinder 5 and air brake valve 6, is shown on an enlarged scale and the various connections indicated. The air brake valve itself is shown in section.

Referring to Figs. 3, 4 and 5, the air brake valve 6 consists of a substantially cylindrical casing 19 divided substantially midway by a transverse partition 20 dividing the interior of said casing 19 into two chambers, an upper chamber 21 and a lower chamber 22. Within the upper chamber 21, a bushing or lining 23 is fitted, the same being made of a suitable material, as of brass, and within the said bushing or lining, a piston 24 is fitted, this piston being of a suitable length to open and close suitable ports through said casing as will be hereafter specified. The piston 24 is provided with a cap 25 on its top side, said cap being provided with a plurality of openings 26. At the center of the piston is provided a circular hole or opening 27, the top of which forms a seat 28 for a conical valve 29 having a stem 30 extending above and below said valve 29, the upper end of said stem 30 preferably passes through a suitable opening 31 in said cap, and the lower end of said stem 30 passes through a suitable gland or stuffing box 32, passing through the said partition 20 into the lower chamber 22. Said cap 25 is secured to the piston in any suitable manner, as by screw threads 33, and within said cap I provide a spring 34 surrounding the upper part of said stem 30 and operating between the interior of said cap 25 and the top of said valve 29 to normally hold said valve 29 upon its seat 28. Surrounding the upper end of said cap 25 and extending to the upper head 35 of said air brake valve is another spring 36, the tension of which tends to hold said piston 24 at its lowermost position, that is, in its position nearest the partition 20. The lower end of the stem 30 extending into the lower chamber 22, is provided with a double jointed link 37 to which is attached a conical valve 38, coöperating with a corresponding conical seat 39 in the head 40 of said air brake valve. Said head 40 is preferably provided with a circular projection 41 fitted within the interior of the cylindrical bore of the lower chamber 22, and is provided with suitable flanges 42 by which it is secured to the corresponding flanges 43 on the casing 19 by suitable bolts 44. Referring now to Figs. 3 and 5, one side of the casing 19 is provided with a flanged projection 45 containing a chamber 46 and to said flanged projection 45 is bolted a suitable head 47 also provided with a projection 48 fitting within the circular bore of the chamber 46; the said head 47 being secured to said flanged projection 45 by bolts 49 in the usual manner of securing such parts together. The casing 19 is further provided with a circular projection 50 having an opening 51 into the chamber 22 the outer end of which opening 51 is provided with a conical valve seat 52, the axis of which is in alinement with the cylindrical chamber 46 and a conical valve 53 is adapted to be seated upon said seat 52. The chamber 46 is provided with a passage way 54 extending into the upper chamber 21 of said air brake valve. The train pipe 7 communicates with the upper portion of the chamber 21 above the piston 24. In the opposite sides of the casing 19, and in substantial alinement with each other, are ports 55 and 56. The port 55 communicates by a pipe 57 and pipe 12 with the main reservoir 1 and the port 56 communicates by the pipe 58 with the auxiliary reservoir 4. Said ports 55 and 56 are normally closed by the cylindrical face of the piston 24. Within the head 47 is a cylindrical hole or opening 59 within which is fitted a suitable bushing 60, the same being substantially concentric with the axis of the chamber 46. Within the bushing 60 is a suitable plunger 61 rigidly secured to the stem 62 of the conical valve 53; said plunger 61 is adapted to slide longitudinally within the bushing 60 and is normally pressed outwardly by a spring 63 so that the conical valve 53 is normally seated upon the valve seat 52. A suitable opening 64 through a plug nut 65 provides an air passage between the chamber to the rear of the plunger 61 and the open air. The lower chamber 22 communicates with the rear end of the brake cylinder 5 by means of a pipe 66 threaded into the opening 67 leading into said chamber 22, and the head 40 is provided with an opening below the valve seat 39 into which is threaded a pipe 67' communicating with the atmosphere. A pipe 68 extends between the auxiliary reservoir 4 and the forward end of the brake cylinder 5.

Having thus described my air brake valve 6 and its connections with the main reservoir, the auxiliary reservoir and the brake cylinder, I will next describe, in detail, the engineer's or controlling valve for operating the air brake valve, referring especially to Figs. 1, 2, 10, 11, 12 and 13. The valve 9 consists of a lower cup shaped casing 69 provided with flanges 70 and an upper hollow casing 71 provided with corresponding flanges 72, the said casings 69 and 71 being connected together by bolts 73 passing through said flanges 70, 72 and clamped between said flanges by said bolts is a flat valve seat or plate 74. Suitable gaskets or packing rings 75, 75, are inserted between said plate or partition 74, and the flanges 70, 72. The lower casing 69 is divided substantially diametrically by a wall 76, the upper edge of which fits tightly against the said plate 74, and the interior of said casing 69 on one side of said wall 76 is sub-divided by similar radial walls 77 and 78 into three similar compartments 80, 81 and 82 as plainly shown in Fig. 10. Concentric with said casing is an opening 83 communicating with the train pipe 7 and chamber 79. The compartment 80 communicates by an opening 84 with the pipe 11 leading to the open air. The compartment 81 communicates by an opening 85 with the pipe 12 leading to the main reservoir 1 and the compartment 82 communicates through an opening 86 with the main reservoir 1 through the pipe 15. The plate 74 is provided with a series of openings communicating respectively with the chambers 79, 80, 81 and 82. I preferably make three openings 87, 88 and 89 communicating with the chamber 80 of constantly increasing size with spaces between the same and diametrically opposite said openings 87, 88 and 89, I provide an elongated opening 90. I also provide an opening 91 through the plate 74 over the chamber 81 and a diametrically opposite opening 92 communicating with the chamber 79 and over the chamber 82. I provide an opening 93 to coöperate with a diametrically opposite opening 94 which communicates with the chamber 79 and the train pipe 7. This partition or plate 74 with the openings above described, forms the seat of my improved engineer's or controlling valve, the valve itself being formed of a substantially circular disk 95 provided with a comparatively narrow straight diametric groove 96. Said disk 95 is carefully ground true to its seat 74 and is provided with a stem 97 passing through a suitable gland or stuffing box 98 and provided at its end with a handle 99 by which it can be turned about the axis of the same to bring the slot 96 into register with the various openings in the seat 74. The slot 96 should be narrower than the distance between the ports 87 and 91 or the port 91 and the port 93 so that the train pipe may be cut off from all of said ports and held between them when desired. The handle may be provided with a spring click 100 in order to lock the valve in any desired adjusted position. The valve itself is securely held on its seat 74 by a spiral spring 101 encircling said stem 97 and exerting its tension between said gland 98 or the top of the casing 71 and the top of the valve 95. By arranging the ports and the controlling valve diametrically opposite each other, I secure a balancing of the valve upon its seat. The pressure of the air passing through the valve does not tend to tilt the valve off its seat thereby allowing the air to leak through the valve or escape from the various ports in said partition. With the openings or ports in the partition arranged in this manner, the valve always rests squarely upon the partition or seat.

Referring now to Figs. 1, 2 and 14, I will briefly describe the pressure regulator by which the air in the main reservoir is maintained at a substantially constant pressure: Within a suitable casing 102, provided with a cylindrical bore 103, is a bushing 104 of suitable material, such as brass, within which is fitted a piston 105. The piston 105 is provided with a piston rod 106 passing through a suitable stuffing box 107 on the top of said casing 102. Below said piston 105 is a suitable compression spring 108 tending to force said piston to its upper most position. The piston rod 106 is provided with suitable projections 109 and 110 adapted to coöperate with a switch mechanism as follows: To the side of the casing 102 is attached a bracket 111 in any suitable manner, as by screws 112, said bracket having pivoted thereon a three armed lever 113 and the projection 109 of the piston rod 106 is located between two of said arms, namely, 114 and 115. The third arm 116 of said three armed lever 113, extends away from the pivot 117 of said three armed lever 113 to the rear of said arms 114 and 115. Said bracket 111 is provided with a further projection 118 and the end 119 of said arm 118 and the pivot 117 are in substantial alinement with the middle of the path of the movement of the end of the arm 114 about its pivot 117, a spring 120 connects the end of the arm 114 and the end 119 of the arm 118. The bracket 111 is provided with a suitable guide way 121 within which a stem 122 of the movable member 123 of an electric switch is adapted to slide, and said member 123, is provided on its end with a contact 124 insulated therefrom by a suitable insulation 125. The movable member 123 is normally forced to its lowermost position by a coil spring 126 encircling said stem 122 and the upper end of said stem 122 is provided with a projection 127 extending into the path of the movement of the arm 116 of the lever 113. Also secured to the casing 102 and insulated therefrom by means of suitable insulation 128, is a bracket 129 also provided with a contact point 130, the same being formed of any suitable material, such as carbon or copper and arranged in the form of a plunger having a head 131 inclosed within a cylindrical opening 132 to the end of the bracket 129. Said contact 130 is made slightly yielding, but is normally held in its uppermost position by a compression spring 133, secured within said arm and passing between said head 131 and a plate 134 by which said circular bore 132 is closed. Suitable electric connections 135, 136 extend from said contact points through a suitable source of electrical energy 136' to a suitable electric motor 136'' operatively connected with the air pump 2 in any suitable and well known manner.

17 and 18 are pressure reducing valves and they are shown diagrammatically on an enlarged scale in Figs. 7, 8 and 9. They may be of any well known and ordinary form of fluid operated reducing valves. Each consists, mainly, of a plunger or piston 137 having the head or enlarged portion mounted to slide in a cylindrical bore 138, and its smaller end or stem fitting a smaller bore 139. The stem or plunger 137 is arranged to fill and close the opening 139, which is connected to the main reservoir pipe 12, and extending transversely from said cylindrical bore 139 and normally closed by said stem of the piston or plunger 137 is a port 140 leading to the motorman's or controlling valve, and said passage 140 has a side or transverse passage 141 communicating with the chamber 138 on the other side of the plunger. The areas of the end of the stem fitting the opening 139 and the head of the plunger fitting the opening 138 are so proportioned as to give a predetermined reduction of pressure. When the pressure in the larger chamber 138 falls below a predetermined point, the plunger 137, will move in that direction placing the port 140 in communication with the chamber 139 and consequently with the high pressure of the main cylinder, and the air will pass around the reducing valve until the air in the chamber 138 has been built up to the required pressure, whereupon the lower pressure acting upon the larger surface of the plunger 137 will close the port 140.

Referring now to Fig. 3, the brake cylinder 5 comprises the usual casing and is provided with a plunger 142, traversing substantially the length of said cylinder, and in the position shown in Fig. 3 the piston or plunger 142 is in the position which it occupies when the brake is in the released position. The cylinder head 143 of the brake cylinder 5 is provided with a stuffing box or gland 144, and the packing 145 is preferably made with tapering sides converging away from the piston rod 146 and the top of the packing is put into communication with the interior of the brake cylinder by means of suitable openings 147 around the gland. By means of this, when the pressure is admitted to the forward end of the cylinder, the air also passes through the ports 147 to the top of the packing, and tightly forces it around the piston rod 146 making the packing substantially air tight. The piston rod 146 is preferably of a large diameter and may be made either hollow or solid as the conditions require, but the size of the piston rod is so made that the effective area of the piston rod on the forward side is considerably less than that on the rear side of the same. I provide this construction so that when the air is balanced, that is to say, of the same pressure per square inch on both sides of the piston head 142, the effective pressure on the rear end of the piston will be greater than that on the forward end, and consequently, the piston will be moved to the forward position shown in Fig. 3. This arrangement makes it possible to release the brakes without the use of any spring, or any other moving means, other than the pressure of the air in the cylinders. The brake is applied by admitting air to the forward end of the cylinder to move the piston 142 to the opposite end of the brake cylinder to that shown in Fig. 3 and when the air is then admitted to the rear end of the brake cylinder having the same pressure per square inch as that upon the forward end of the piston, the piston will move to the release position.

Inasmuch as the pressure reducing valves 17 and 18 are used only when the system of this application is used with other well known systems, such as the Westinghouse system or the New York system, I will first describe the operation of my system omitting all references to the reducing valves 17 and 18, that is to say, with the reducing valves 17 and 18 cut out, and in this explanation of the operation of my system Figs. 3, 4 and 5 will be especially referred to. In the position shown in Fig. 3, the brake is released, and the piston 142 is in the forward end of the brake cylinder. The piston 24 of the valve 6 is in its normal position, cutting off the ports 55 and 56 from the interior of the said air brake valve. The pressure above and below the piston 24 is the pressure of the train pipe 7. To apply the brakes, the train pipe 7 is put into communication with the open air, thus reducing the pressure in the upper part of the chamber 21 above the piston 24. As a result of this, the piston 24 moves upwardly carrying with it the valve 29, which will remain closed and raising the valve 38 off its seat 39. This puts the rear end of the brake cylinder 5 through the pipe 66, and the lower chamber 22 of the air brake valve past the valve 38 and through the pipe 67, into communication with the open air, whereupon the pressure of the air in the auxiliary reservoir 4 is communicated through the pipe 68 to the forward end of the brake cylinder 5, and moves the piston 142 in the direction of the arrow 5', shown in Fig. 3, and thus applies the brakes. To release the brakes, the train pipe 7 is put into communication with the main reservoir 1 through the main reservoir pipe 12. This immediately raises the pressure in the upper chamber 21 above the piston 24, and being greater than the pressure on the air below the piston 24, forces the piston down carrying with it the valve 29 which remains upon its seat until the valve 38 is seated upon its seat 39. The piston 24 continues its downward movement under the greater pressure above the piston from the main reservoir 1 until the upper end or edge of the piston 24 passes below the upper edge of the ports 55 and 56, whereupon the main reservoir 1 through the pipes 12 and 57 and the auxiliary reservoir 4 through the pipe 58, are both placed in communication with the spaces in the chamber 21 above the piston 24. The air from the main reservoir recharges the auxiliary reservoir and passing through the valve 29 to the lower half of the chamber 21 below the piston 24 passes through the port 54 to the chamber 46. The spring 63 is of a predetermined tension and is set so that the valve 53 will be held close on its seat 52 whenever the pressure in the chamber 46 is lower than the pressure in the reservoir 4 after the brakes have been applied; that is to say, that the normal pressure in the auxiliary reservoir 4 before the application of the brakes is 70 pounds and after the brakes have been applied and the air in the auxiliary reservoir expanded into the brake cylinder until the pressure in the auxiliary reservoir 4 is reduced to 50 pounds, the spring 63 would be made so that the valve 53 would be held upon its seat until the pressure in the chamber 46 was 50 pounds or more. Above this pressure the air in the chamber 46 will act upon the plunger or piston 61, forcing it outwardly against the tension of the spring 63 and moves the valve 53 off its seat 52. As soon then, as the air below the piston 24 has been built up to a pressure necessary to open the valve 53, the air will continue to pass from the main reservoir, past the valve 29 and past the valve 53 to the lower chamber 22 of the air brake valve and thence to the rear end of the piston 142. When, however, the pressure above and below the piston 24 has been raised to the pressure of the main reservoir, the valve will become balanced and will move upwardly under the influence of the spring 34 and shut off the ports 55 and 56. During this operation, the pressure on both sides of the piston 142 has been the same, that is to say, both the forward and rear ends of the brake cylinder 5 have been in communication with the pressure of the air in the auxiliary reservoir and the piston 142 will return to the position indicated in Fig. 3, thus releasing the brakes. These operations are clearly illustrated in a diagrammatic manner in Figs. 7 and 8.

The tension of the spring 34 is made merely sufficient to hold the valve 29 upon its seat 28 and to move the piston 24 upwardly when the pressure above and below the piston 24 is the same. In making this valve, the operation of which has been above described, the head 42 is provided with the projection fitting within the bore of the chamber 22 and the head 47 is provided with a similar projection 48 fitting within the chamber 46 in order to insure the exact positioning of the valve 38 upon its seat 39 and the valve 53 upon its seat 52 when the heads 42 and 47 are removed and again put in place. With this arrangement, it is impossible in reassembling the various parts, to fail to obtain a perfect adjustment of the said valves upon their respective seats. The piston or plunger 61, operated by a predetermined pressure in the chamber 46 is also an important and very desirable provision for effecting the certain operation of the valve 53. The parts are arranged and constructed so that there is no liability of breakage or undue wear of the mechanism for operating said valve 53. The spring 36 above the cap 25 also is made of such a strength as to overcome the friction between the piston 24 and lining 23. There is no liability of the piston 24 sticking on account of the pressure necessary to obtain an air tight joint between the two said parts, since the friction is balanced by the spring 36. It will also be seen in the apparatus above described, that when the piston 24 is moved to its lowest position, to release the brakes, the main reservoir and the auxiliary reservoir are in direct communication with each other over the top of the piston 24 and the rear end of the brake cylinder 5 is also in communication with the main reservoir 1, and the auxiliary reservoir 4 through the valve 29, chamber 21, port 54, chamber 46, valve 53, port 51, chamber 22 and pipe 66. It will also be observed that in releasing the brakes no air is discharged from the system, since the air pressure is merely equalized on both sides of the piston 42 by putting both sides of the piston 142 in communication with the main and auxiliary reservoirs, and the auxiliary reservoir 4 is at the same time recharged directly from the main reservoir 1.

In Fig. 6 I have shown a modified form of the valve shown in Fig. 4, the cap 25' is provided with an opening 148 normally closed by a valve 149 retained upon its seat 150 by a light spring 151. The valve 29' is provided on its top with a sleeve or guide-way 152 into which the stem 153 of the valve 149 is adapted to loosely slide. The sleeve 152 is provided with one or more openings 154 communicating with the interior of the sleeve and with a port or passage way 155 extending longitudinally of the stem 30' below the valve 29'. Below the top of the gland or stuffing box 32, said passageway 155 terminates in a transverse port 156. In its normal position with the brake released, the port 156 is normally below the top of the gland 32. When the brakes are applied, the pressure above the piston 24 is reduced as above described, by putting the train pipe 7 to open air and the piston 24 will rise to a higher position than that shown in Fig. 6 and will bring the port 156 into communication with the lower part of the chamber 21 below the piston 24. By reason of this arrangement, I am enabled to very quickly and effectively bring all the brakes throughout a train into operation at substantially the same time, a slight difference in the pressure above and below the piston 24 being arranged to operate the valve 149. In other respects, the operation of this valve is like that of the valve shown in Figs. 4 and 5 and previously described. While the spring 151 may be sufficiently strong to hold the valve 149 and the valve 29 upon their seats, it may be desirable to use a spring 34' between the interior of the cap and the top of the valve 29', to hold the valve 29' upon its seat, and the spring 151 be only sufficiently strong to hold the valve 149 upon its seat.

Referring now to Figs. 7 to 13, I will describe the construction and operation of my controlling valve or engineer's valve and the pressure reducing valves 17 and 18. It will be observed that the valve 53 is set by the spring 63 so that the valve will not be unseated when the pressure in the chamber 46 falls below a certain predetermined pressure, as for instance, 50 lbs., which pressure will be called the minimum releasing pressure, inasmuch as no air can pass to the rear end of the brake cylinder until the pressure in the chamber 46 is sufficient to open the valve 53. When, therefore, my improved system is used with cars equipped with the Westinghouse or other system, it is necessary to have an automatic device, namely, the pressure reducing valves 17 and 18 to take care of this minimum releasing pressure feature of my system. Assuming then, that the pressure in the main reservoir is normally 90 lbs., the pressure reducing valve 17 is so arranged as to maintain, under these conditions, a pressure of 70 to 90 lbs. in the train pipe. The auxiliary reservoir 4 will, therefore, normally contain air at a pressure of 70 to 90 lbs., and when the brakes are applied by the expansion of the air contained therein, into the brake cylinder, this pressure will be reduced to 50 lbs.; and the valve 53 set to open at 50 lbs. Connected with the port 93 in the engineer's valve is a pipe 15 connected through the pressure reducing valve 18 with the pipe 12 running to the main reservoir 1 and this reducing valve 18 is set so that the pressures on each side of said valve will normally stand at 90 lbs. on the high side and 50 lbs. on the low side. Under normal conditions, that is to say, with the pressure 90 lbs. in the main reservoir, the air brake valve will operate in the manner which has been previously described, the brake being applied by connecting the train pipe with the open air through the ports 87, 88 and 89 and the pipe 11, as shown in Fig. 8 and released when the train pipe 7 is in communication with the air pipe 12, equalizing the pressure on both sides of the piston 142.

I have provided an additional main reservoir under each car for use when desired, in order that in operating the brakes there will always be a reserve pressure in the main reservoir after the application of the brakes. This excess pressure in the main reservoir is always a reserve local pressure to assist in releasing the brakes and recharging the auxiliary reservoir.

In Fig. 7 the engineer's valve is shown in the running position; that is to say, with the train pipe and the main reservoir pipe connected together through the port 85 of the engineer's valve. In Fig. 8, the valve is shown as in the position used in stopping the train, that is to say, with the train pipe and the open air pipe 11 connected together through one of a series of openings 87, 88 and 89 of gradually increasing size to vary the degree of application of the brakes. 89 is the emergency port of large area in order to effect a quick reduction of pressure in the train pipe to apply the brakes.

In Fig. 9, the system is shown as operating as a direct air brake in building up the pressure in the reservoirs.

In Figs. 1 and 2 and 14, the device for controlling the pressure in the main reservoir 1 is shown. A pipe 157 leads from the main reservoir to the top of the casing 102 above the piston 105, the spring 108 operating upon the opposite side of the piston to counterbalance the pressure in the main cylinder, that is to say, if the main cylinder or main reservoir is to be maintained at a pressure of 90 lbs., the spring 108 is a 90 lb. spring. The device is shown in Fig. 14 in the position which it assumes when the pressure in the main reservoir falls below the predetermined pressure. The piston is then in an elevated position and has closed the circuit through the contacts 124 and 130. When the pressure has been built up to the requisite amount, the piston 105 is forced downwardly and the pin 110 comes in contact with the projection 115 of the lever 112 and turns it upon its pivot 117 until the pin 114 is just below a line passing through the pivot 117, the other support of the spring 119, whereupon the spring quickly acts to throw the arm 116 of the lever 113 upwardly and rapidly breaks the electrical connection. When the contacts 124 and 130 are closed, a circuit is closed through the leads 135 and 136 with an electrical motor which operates the pump; when the circuit is broken the pump ceases to operate. As the pressure in the main reservoir decreases, the reverse of the above operation is performed, that is to say, the piston 105 will rise until the pin 109 engages the projection 115, whereupon the lever will be turned by the piston until it passes the dead center that is to say, the line passing through the pivot 117 and the point of support of the spring 119, whereupon the lever 113 will be quickly operated upon and turned by the tension of the spring 120, throwing the end 116 of the lever 113 downwardly and allowing the spring 126 to force the plunger or stem 122 downwardly, carrying with it the contact point 124 until the same are in positive engagement and the circuit closed.

It will be observed that I have shown the main reservoir pipe 12 as being connected to the engineer's valve between the direct air pipe 15, and the train pipe 7, that is to say, with the service ports 87 and 88 and the emergency port 89, to the left of the main reservoir pipe connection. The exact manner of the arrangement of the various ports and positions into which the handle 99 will be moved in operating the air brake valve by putting the various pipe connections into communication with each other is immaterial and may be varied from the exact arrangements illustrated within reasonable limits, without departing from the spirit and scope of my invention.

While I have mentioned definite pressures, by way of example, to describe the operation of my improved air brake system, it is to be understood that the various springs can be made to meet the requirements of any predetermined pressures, and that the pressures at which the various reservoirs are to be maintained or the valves operated may be changed as may be found necessary or desirable under differing conditions or circumstances, and I do not limit myself to any definite pressures so long as the relations of the pressures, springs and valves are such as to operate in substantially the manner above described.

Having thus described my invention, what I claim and desire to protect by Letters Patent of the United States is:

1. In an air brake system, the combination with an air brake valve and a piston therein, of an auxiliary reservoir and a main reservoir in communication with said air brake valve over said piston, when said piston is depressed.

2. In an air brake system, the combination with an air brake valve having a piston located therein and operating by train pipe pressure, of a main reservoir, an auxiliary reservoir, a brake cylinder, and means to charge said auxiliary reservoir from said main reservoir over said piston, when said piston is depressed.

3. In an air brake system, the combination with an air brake valve having a piston therein operating by train pipe pressure, of a main reservoir, an auxiliary reservoir, a brake cylinder, and means to charge said auxiliary reservoir from said main reservoir over said piston when said piston is depressed and to put both reservoirs in communication with both ends of said brake cylinder.

4. In an air brake system, the combination with an air brake valve having a piston therein operating by train pipe pressure, a main reservoir, an auxiliary reservoir, a brake cylinder, and means to charge said auxiliary reservoir from said main reservoir over said piston, and to put both said reservoirs into communication with the rear end of said brake cylinder through said piston.

5. In an air brake system, the combination with an air brake valve having a piston therein, a main reservoir, an auxiliary reservoir communicating with the upper end of said air brake valve above said piston, a train pipe also communicating with the said air brake valve on the same side of said piston, a brake communicating with said air brake valve on the other side of said piston, a minimum releasing pressure valve controlling the passage between said piston and said air brake cylinder, a controlling valve and means to put said train pipe into communication with the said main reservoir or the open air to move said piston, and means operated by said piston for putting the rear end of said brake cylinder into communication with the open air.

6. In an air brake system, the combination with an air brake valve having a piston therein, of a main reservoir and an auxiliary reservoir adapted to be placed into communication with one end of said air brake valve over said piston when said piston is depressed, a controlling valve, a train pipe connected to said air brake valve on the same side of said piston, a connection leading from said main reservoir to said controlling valve, a connection leading from said controlling valve to the open air, a brake cylinder having its forward end at all times in communication with said auxiliary reservoir, a connection between the rear end of said brake cylinder and said air brake valve on the opposite side of said piston, and a minimum pressure releasing valve in said air brake valve and controlling the passage between said air brake cylinder and said piston.

7. In an air brake system, the combination with an air brake valve having a piston therein, of a main reservoir and an auxiliary reservoir adapted to be placed into communication with one end of said air brake valve over said piston when said piston is depressed, a controlling valve, a train pipe connected to said air brake valve on the same side of said piston, a connection leading from said main reservoir to said controlling valve, a connection leading from said controlling valve to the open air, a brake cylinder having its forward end at all times in communication with said auxiliary reservoir, a connection between the rear end of said brake cylinder and said air brake valve on the opposite side of said piston, a minimum pressure releasing valve in said air brake valve and controlling the passage between said air brake cylinder and said piston, and a pump for maintaining the pressure in said main reservoir.

8. In an air brake system, the combination with an air brake valve having a piston therein, of a main reservoir and auxiliary reservoir adapted to be placed into communication with one end of said air brake valve over said piston when said piston is depressed, a controlling valve, a train pipe connected to said air brake valve on the same side of said piston, a connection leading from said main reservoir to said controlling valve, a connection leading from said controlling valve to the open air, a brake cylinder having its forward end at all times in communication with said auxiliary reservoir, a connection between the rear end of said brake cylinder and said air brake valve on the opposite side of said piston, a minimum pressure releasing valve in said air brake valve and controlling the passage between said air brake cylinder and said piston, a pump for maintaining the pressure in said main reservoir, and a governor for operating said pump when the air pressure in the main reservoir falls below a predetermined pressure.

9. In an air brake system, an air brake valve, a piston operated by train pipe pressure, said piston, when depressed, allowing direct communication over said piston between the main and auxiliary reservoirs of said system.

10. An air brake valve, provided with an operating piston, a main reservoir port and an auxiliary reservoir port, said ports being closed when said piston is in its normal balanced position, and opened over said piston when said piston is depressed by an increase of pressure in the train pipe.

11. In an air brake valve, the combination of a substantially cylindrical casing and a partition dividing said casing into two chambers, said casing being provided with an intermediate chamber and passageways around said partition communicating with said two first mentioned chambers, a valve in said intermediate chamber, a plunger carrying said valve, and a spring to hold said valve closed when the pressure in said intermediate chamber is below a predetermined point to close communication between said first mentioned chambers.

12. In an air brake valve, the combination with a substantially cylindrical casing, a partition dividing said casing into two chambers, of a piston located in one of said chambers and controlled by the train pipe pressure, said casing being provided with a pair of ports in substantial alinement with each other and normally closed by said piston, an intermediate chamber in said casing between said first mentioned chambers, and ports leading from said first mentioned chambers to said intermediate chamber, a valve in said intermediate chamber closing communication between said first mentioned chambers when pressure is below a predetermined point, a port in said second chamber adapted to be put into connection with the rear end of the brake cylinder, a valve in said second chamber connected to said piston, and means connecting said piston and said valve in said second chamber to lift said valve when the piston moves away from said partition to put said second chamber into communication with the open air.

13. In an air brake valve, an upper chamber, a piston slidable therein, a main reservoir port and an auxiliary port normally closed by said piston and in substantial alinement with each other, a train pipe port in said valve above said piston, a lower chamber, a valve in said lower chamber adapted when opened to put said lower chamber into communication with the open air, a valve in said piston having a stem connected to said valve in said second chamber and passing through said partition, the upward movement of said piston under a reduction of the train pipe pressure communicating its motion to said valve in said lower chamber to lift the same from its seat and the downward movement of said piston due to an increase in the pressure in the train pipe closing said valve in said second chamber and opening said valve in said piston to allow the air to pass from said upper chamber through said piston to said lower chamber and thence to the rear end of the brake cylinder.

14. In an air brake valve, a casing, a pair of chambers, a cylindrical intermediate chamber, a minimum releasing valve in said intermediate chamber and operated by the pressure in said intermediate chamber to open and close communication between said pair of chambers, a head, having a projection fitting into said intermediate chamber, said valve being mounted in said head concentric with said chamber and said projection.

15. In an air brake valve, a pair of chambers, an intermediate chamber, ports leading from each of said pair of chambers to said intermediate chamber, a minimum releasing valve in said intermediate chamber, a head having a projection fitting into said intermediate chamber, said valve being mounted in said head concentric with said chamber and said projection.

16. In an air brake valve, a casing provided with a minimum releasing pressure valve chamber of cylindrical shape, a head having a projection fitting into said chamber, and a valve carried by said head concentric with said projection on said head.

17. In an air brake valve, an upper and lower chamber, an intermediate cylindrical chamber, a port leading from said lower chamber to said intermediate chamber, a valve seat on the end of said port leading into said intermediate chamber, a valve adapted to be seated on said seat, a plunger connected to said valve, a cylindrical bore in which said plunger is adapted to slide and to carry said valve toward and away from said seat, a spring under compression operating against said plunger to hold said valve upon its seat.

18. In an air brake valve, an upper and lower chamber, an intermediate cylindrical chamber, a port leading from said lower chamber to said intermediate chamber, a valve seat on the end of said port leading into said intermediate chamber, a valve adapted to be seated on said seat, a plunger connected to said valve, a cylindrical bore in which said plunger is adapted to slide and to carry said valve toward and away from said seat, a spring under compression operating against said plunger to hold said valve upon its seat, a head having a projection thereon adapted to fit into said intermediate cylindrical chamber, said bore for said plunger being located in said head and in alinement with said valve.

19. In an air brake valve, a cylindrical casing having ports on opposite sides thereof and in alinement with each other, a piston having a cap and adapted to close said ports when in normal position, a valve in said piston, a spring within said cap to hold said valve on its seat, and a spring between said cap and the interior of said casing.

20. In an air brake valve, a casing, a partition dividing said casing into two cylindrical chambers, a piston in one of said chambers, a port leading from the other of said chambers and providing means of communication between said chambers, a valve seated on said port, a plunger by which said valve is carried, and a spring between said plunger and said casing to hold said valve upon its seat.

21. A controlling valve comprising a circular casing having a partition dividing said casing into two chambers and diametrically opposite ports in said partition.

22. A controlling valve comprising a lower casing divided into compartments, a partition covering said compartments and provided with ports diametrically arranged, a rotatable valve member engaging said partition and provided with a groove in its face adjacent said partition to bring at will a certain one of said ports into communication with each of the other ports.

23. In a controlling valve, a partition having ports therein diametrically arranged, and a rotatable member having a groove adapted to be turned over said partition to bring the opposite ports into communication with each other.

24. In a controlling valve, a casing having a partition therein dividing said casing into two compartments, the lower compartment being provided with substantially radial partitions dividing one half of said lower portion into three compartments, two of said three compartments being in communication with the main reservoir pipe, the third of said three compartments being in communication with the open air, the fourth compartment comprising substantially one half of said lower casing, and being in communication with the train pipe, said partition being provided with a port communicating with the main reservoir pipe, a series of ports of increasing size through said partition into said compartment communicating with the open air, and means for putting said ports into communication with said train pipe compartment.

25. In a controlling valve, a casing, a partition dividing said casing into two compartments, said partition being provided with oppositely disposed ports, a valve member having a groove adapted to place at will opposite ports in said partition in communication with each other, a stem connected to said valve member and extending through said upper casing, a spring surrounding said stem to hold said valve firmly against said partition and an adjusting handle connected to said stem.

26. An air brake valve comprising a casing provided with a train pipe port and a brake cylinder port, and a minimum pressure releasing valve for closing communication between said ports.

27. An air brake valve comprising a casing provided with two chambers, one of said chambers being provided with a train pipe port and an auxiliary reservoir port, the other of said chambers being provided with a brake cylinder port and a minimum pressure releasing valve for closing communication between said chambers.

28. An air brake valve comprising a casing provided with two chambers, one of said chambers being provided with a train pipe port and an auxiliary reservoir port, means operated by change of pressure in the train pipe for controlling communication between said chambers, the second chamber being provided with a brake cylinder port and a minimum pressure releasing valve for closing communication between said chambers.

29. An air brake valve comprising a casing provided with two chambers, one of said chambers being provided with a train pipe port and an auxiliary reservoir port, means operated by change of pressure in the train pipe for controlling communication between said ports, the second chamber being provided with a brake cylinder port and an open air port, a minimum pressure releasing valve for closing communication between said chambers, and means for automatically closing and opening said open air port.

30. An air brake valve comprising a casing provided with a main reservoir port, an auxiliary reservoir port, a train pipe port, a brake cylinder port and an open air port, and means operated by a reduction in pressure in the train pipe for opening said open air port.

31. An air brake valve comprising a casing provided with a main reservoir port, an auxiliary reservoir port, a train pipe port, a brake cylinder port and an open air port, means operated by a reduction in pressure in the train pipe for opening said open air port, and means operated by an increase in pressure in the train pipe for closing said open air port and putting the remaining ports into communication with each other.

32. An air brake valve comprising a casing provided with a train pipe port, an auxiliary reservoir port, a brake cylinder port and an open air port, means operated by a decrease in pressure in the train pipe for opening said open air port, means operated by an increase in pressure in the train pipe for connecting said train pipe port with said auxiliary reservoir port, and a minimum pressure releasing mechanism for shutting off communication between said train pipe port and said brake cylinder port.

33. An air brake valve comprising a casing provided with a train pipe port, an auxiliary reservoir port, and a main reservoir port normally cut off from each other, and means operated by a change in the pressure in the train pipe for putting said ports into communication with each other.

34. A controlling valve for an air brake system having a partition provided with a main reservoir port, an open air port and a train pipe port diametrically opposite said ports, and a plate provided with a diametrical groove rotatably mounted on said partition.

35. A controlling valve for an air brake system having a partition provided with a main reservoir port, a series of graduated open air ports, a train pipe port diametrically opposite said ports, and a plate provided with a diametrical groove rotatably mounted on said partition.

36. In an air brake valve, the combination with a casing, of a stationary partition dividing said casing and forming separate chambers, an intermediate chamber connected with the chambers on opposite sides of said partition, a releasing valve in said intermediate chamber and operated by the pressure therein to open and close communication between the chambers upon opposite sides of said partition, a head, having a projection fitted into said intermediate chamber.

37. In an air brake valve comprising a casing having an integral partition forming separate chambers, the combination with an auxiliary cylinder connected by ducts with the respective chambers upon opposite sides of said partition, a valve arranged to control said ducts, and actuated by the pressure in one of said chambers to admit pressure into the other chamber.

In witness whereof, I have hereunto set my hand this first day of September, A. D. 1908.

ANDREW J. WISNER.

Witnesses:
   FREDERICK A. BLOUNT,
   ALEXANDER PARK.